United States Patent
Salecker et al.

[11] Patent Number: 6,113,517
[45] Date of Patent: Sep. 5, 2000

[54] MOTOR VEHICLE WITH A POWER TRAIN HAVING AN AUTOMATED CLUTCH

[75] Inventors: Michael Salecker, Bühl; Martin Zimmermann, Sasbach; Franz Kosik, Ostfildern; Thomas Grass, Urbach, all of Germany

[73] Assignees: LuK Getriebe-Systeme GmbH, Buhl/Baden; Daimler-Benz Aktiengesellschaft, Stuttgart, both of Germany

[21] Appl. No.: 09/059,079

[22] Filed: Apr. 9, 1998

[30] Foreign Application Priority Data

Apr. 9, 1997 [DE] Germany ............................. 197 14 638

[51] Int. Cl.$^7$ .................................................. B60K 23/00
[52] U.S. Cl. ............................. 477/174; 477/97; 477/180
[58] Field of Search .................... 477/97, 98, 166, 477/169, 174, 175, 176, 180

[56] References Cited

U.S. PATENT DOCUMENTS

| | | |
|---|---|---|
| 5,169,365 | 12/1992 | Friedmann . |
| 5,176,234 | 1/1993 | Reik et al. . |
| 5,217,412 | 6/1993 | Indlekofer et al. . |
| 5,377,796 | 1/1995 | Friedmann et al. . |
| 5,409,091 | 4/1995 | Reik et al. . |
| 5,450,934 | 9/1995 | Maucher . |
| 5,667,448 | 9/1997 | Friedmann . |
| 5,823,912 | 10/1998 | Fischer et al. ............................ 477/97 |

*Primary Examiner*—Khoi Q. Ta
*Attorney, Agent, or Firm*—Darby & Darby

[57] ABSTRACT

The power train of a motor vehicle has an automated clutch which can transmit torque from a prime mover to a transmission in response to signals from an electronic control unit. The latter causes the clutch to transmit a constant torque during a first interval, to thereupon transmit a gently varying torque during a second interval if the operator of the motor vehicle fails to carry out certain necessary operations prior to elapse of the first interval, and to thereafter transmit a pronouncedly varying torque during a third interval if no remedial undertakings were completed during the second interval. The third interval is cut short if the engine tends to choke, and the full or shortened third interval can be followed by a fourth interval corresponding to the first interval or by a further interval corresponding to the second interval.

17 Claims, 3 Drawing Sheets

MOTOR VEHICLE WITH A POWER TRAIN HAVING AN AUTOMATED CLUTCH

BACKGROUND OF THE INVENTION

The invention relates to improvements in motor vehicles, and more particularly to improvements in power trains which can be utilized in passenger cars, trucks, vans and/or other types of motor vehicles. Still more particularly, the invention relates to improvements in power trains of the type having an automated torque transmitting system (hereinafter often called clutch or friction clutch for short) between a prime mover (such as an engine or a motor) and a transmission or downstream of the transmission. The invention also relates to improvements in methods of and in means for operating an automated clutch in the power train of a motor vehicle.

It is known to provide a power train with a signal receiving, processing and transmitting control unit which can influence the condition (such as the extent of engagement or disengagement) of an automated clutch by way of one or more actuators. As used in this specification, the term "actuator" denotes or can denote a device that performs an action or outputs a signal in response to a signal from a computer, such as from the electronic circuit of a signal receiving, processing and transmitting control unit. For example, the control unit can receive signals from one or more sensors and/or electronic circuits by way of one or more buses and/or other types of signal transmitting conductors, and comprises an electronic circuit (such as a microprocessor) which transmits processed or evaluated signals to one or more actuators serving to partially or fully engage or disengage the automated clutch by way of a fluid-operated, mechanical and/or other clutch engaging/disengaging arrangement. The signals which are being transmitted to the electronic circuit of the control unit can be processed to indicate the extent of slip between the customary friction linings of a rotary clutch plate or clutch disc and the adjacent (engine-driven) constituent(s) of the automated clutch. Signals denoting the thus determined slip and hence the magnitude of the torque which the clutch can transmit can be utilized to ascertain the energy input in the region of the friction linings, to determine the rise of the temperature of the friction linings in comparison with a preselectable value, and/or the extent of wear upon the friction linings.

Motor vehicles with power trains of the above outlined character are disclosed, for example, in published German patent applications Nos. 40 11 850 (corresponding to U.S. Pat. No. 5,176,234) and 196 02 006 (corresponding to U.S. Pat. No. 5,823,912). A drawback of conventional power trains is that improper utilization of the automated clutch can lead to accidents and/or extensive damage to the power train. For example, if a motor vehicle is to be brought to a halt on an inclined road surface without the utilization of the vehicle brake, or when an attempt is made to start the vehicle while the transmission is in a gear other than a gear which is suitable for starting, this involves an increased energy input in the region of the friction linings on the clutch disc or clutch plate of the friction clutch due to an increased slip between the friction linings and the adjacent constituents (such as an engine-driven flywheel and an engine-driven spring-biased pressure plate of the clutch). Any increase of slip entails an undesirable pronounced rise of temperature which, in turn, can contribute to a greatly increased wear upon, or even to a destruction of, the friction linings.

The power train which is disclosed in the aforementioned published German patent application No. 40 11 850 (corresponding to U.S. Pat. No. 5,176,234) is constructed and assembled in such a way that the clutch is automatically engaged or disengaged when the frictional capability or engagement of the clutch reaches a preselected value. For example, if the power train happens to disengage its automated clutch without any prior warning or signaling to the operator of the motor vehicle, the power flow from the prime mover (such as a motor or an internal combustion engine) to the driven wheels is interrupted, i.e., the operator is no longer in a position to accelerate the vehicle. This can entail serious danger to the occupant(s) of the motor vehicle, e.g., when the vehicle is at a standstill and an accident and/or another calamity can develop if the motor vehicle cannot be set in motion or cannot be set in motion within a relatively short or very short interval of time. Automatic engagement of the clutch without prior notice, signal or any other warning to the operator of the motor vehicle can also result in or lead to situations which are or which might be dangerous to the occupant(s) and/or can be a cause of damage to or complete destruction of the motor vehicle.

The power trains which are disclosed in the aforementioned published German patent application No. 196 02 006 (corresponding to U.S. Pat. No. 5,823,912) are designed in such a way that the operator of the motor vehicle is warned, for example, when the temperature of the friction linings rises to an undesirable predetermined value and/or when the wear upon the friction linings forming part of an automated friction clutch exceeds a preselected maximum permissible wear. For example, the warning or notice can consist in that the automated friction clutch is caused to transmit a torque which varies as a function of time and entails a jolting or bucking or analogous undesirable (because uncomfortable) movements of the motor vehicle. Such variations of torque, which is being transmitted by the automated clutch in response to excessive wear upon and/or an overheating of the friction linings, persist if the operator fails to detect and/or to react to the bucking and/or other undesirable irreguar movements of the vehicle. This, in turn, can entail an overheating of the clutch actuating or operating means and can result in damages which are caused by such overheating.

OBJECTS OF THE INVENTION

An object of the invention is to provide a power train which overcomes the above enumerated drawbacks of conventional power trains in a novel and improved manner.

Another object of the invention is to provide a power train for use in a motor vehicle with novel and improved means for operating an automated torque transmitting system, such as a friction clutch with friction linings between engine-driven components of the clutch.

A further object of the invention is to provide a motor vehicle, such as a passenger car, a truck or a van, which embodies the above outlined power train, namely a power train with an automated friction clutch between the prime mover and the transmission or downstream of the transmission.

An additional object of the invention is to provide a power train with novel and improved means for warning the operator of the motor vehicle that the automated clutch and/or other components of the power train are out of commission or operate unsatisfactorily and require immediate or timely attention.

Still another object of the invention is to provide a power train which is constructed and assembled in such a way that excessive stressing of one or more components (such as, for example, thermal stressing of and/or excessive wear upon the friction linings forming part of the clutch plate or clutch disc in an automated friction clutch) is less likely to develop than in heretofore known power trains.

A further object of the invention is to provide a power train which is more reliable and more versatile than conventional power trains for use in motor vehicles.

Another object of the invention is to provide a novel and improved combination of an automated friction clutch and clutch operating means for use in the power train of a motor vehicle.

An additional object of the invention is to provide a power train which is designed to ensure that any defects in the construction and/or mode of operation of one or more constituents (such as an automated clutch and operating means therefor) cannot be disregarded or overlooked and are being attended to in good time prior to the development of additional damage and/or an accident.

Still another object of the invention is to provide a novel and improved method of operating a power train in a motor vehicle.

A further object of the invention is to provide a novel and improved method of operating an automated friction clutch in the power train of a motor vehicle.

Another object of the invention is to provide a method of automatically eliminating and/or limiting the detrimental effects of malfunctions in the operation of a power train wherein an automated torque transmitting system (such as a friction clutch) transmits torque from a prime mover to a manual or automatic transmission or receives torque from such transmission.

An additional object of the invention is to provide a power train which constitutes an improvement over and a further development of power trains of the type disclosed in U.S. Pat. Nos. 5,176,234 and 5,823,912.

SUMMARY OF THE INVENTION

The invention is embodied in a motor vehicle which comprises a power train including a transmission, a variable-RPM prime mover, a repeatedly engageable and disengageable automated torque transmitting clutch having friction linings which are subject to beating and wear in response to repeated engagement and disengagement of the clutch and which are arranged to slip relative to adjacent constituents (such as an engine-driven pressure plate and an engine-driven countepressure plate or flywheel) of the clutch in an at least partially engaged condition of the clutch, and means for operating the clutch. The operating means includes a signal receiving, processing and transmitting control unit, means for transmitting signals to the control unit including means for transmitting signals denoting the RPM of the prime mover, and at least one actuator for changing the extent of engagement of and hence the magnitude of torque being transmitted by the clutch in response to signals from the control unit. In accordance with a feature of the invention, the control unit is arranged to determine and/or ascertain the extent of slip of the friction linings relative to the aforementioned prime mover-driven constituents of the clutch, to ascertain the magnitude of torque which the clutch is capable of transmitting, to calculate at least one of (a) an energy input of the friction linings, (b) a rise of temperature of the friction linings, and (c) the extent of wear upon the friction linings on the basis of the ascertained slip and magnitude of torque, to compare the ascertained magnitude of torque with a first threshold value, to compare the ascertained rise of temperature with a second threshold value, to compare the ascertained extent of wear with a third threshold value, to maintain the magnitude of torque being transmitted at least substantially unaffected by the energy input for a first interval of time when at least one of the threshold values is exceeded, to repeatedly vary the magnitude of torque being transmitted as a function of time during a second interval of time following the first interval, and to increase the torque being transmitted by the friction clutch during a third interval of time following the second interval of time or prior to expiration of the third interval when the RPM of the prime mover decreases or drops to or even below a predetermined minimum value.

The signal transmitting means can comprise one or more sensors (such as switches, tachometer generators or the like) and/or one or more electronic circuits (such as an engine circuit).

The signal transmitting means can further comprise one or more conductors, such as cables, wires and/or buses.

The control unit can be arranged to vary the amplitude and/or the frequency of variable torque which is being transmitted during the second interval of time. Thus, the control unit can be arranged to pulse or pulsate the torque which is being transmitted during the second interval of time.

Still further, the control unit can be arranged to maintain the magnitude of the torque, which is being transmitted upon elapse of the third interval of time or when the RPM of the prime mover decreases to the predetermined minimum value, at least substantially unaffected by the energy input for a fourth interval of time having a duration which can match or at least approximate that of the first interval.

The control unit can be arranged to repeatedly vary the magnitude of (such as pulsate) the torque which is being transmitted upon elapse of the third interval, or when the RPM of the prime mover decreases to the predetermined minimum value, for a further interval of time having a duration which matches or at least approximates that of the second interval.

The control unit can comprise means for varying the duration of at least one of the first, second, third, fourth and/or further intervals or for maintaining constant at least one of these intervals.

The transmission of the power train can be designed to be shiftable into any one of a plurality of different gears and can comprise gears selecting means. The control unit in such power train can comprise means for determining the duration of at least one of the first, second, third, fourth and further intervals of time as a function of the selected gear of the transmission.

The transmission can comprise a variable-RPM rotary element (such as an input shaft which is rotated by the clutch), and the control unit can comprise means for cutting short the second interval of time when the RPM of such element of the transmission rises to or exceeds a predetermined value. The predetermined RPM of the rotary element of the transmission can match or at least approximate the predetermined minimum RPM of the prime mover or it can differ from such minimum RPM.

The predetermined RPM of the rotary element of the transmission and/or the predetermined minimum value of the RPM of the prime mover can be a function of the selected gear of the transmission.

The novel features which are considered as characteristic of the invention are set forth in particular in the appended claims. The improved power train itself, however, both as to its construction and the mode of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
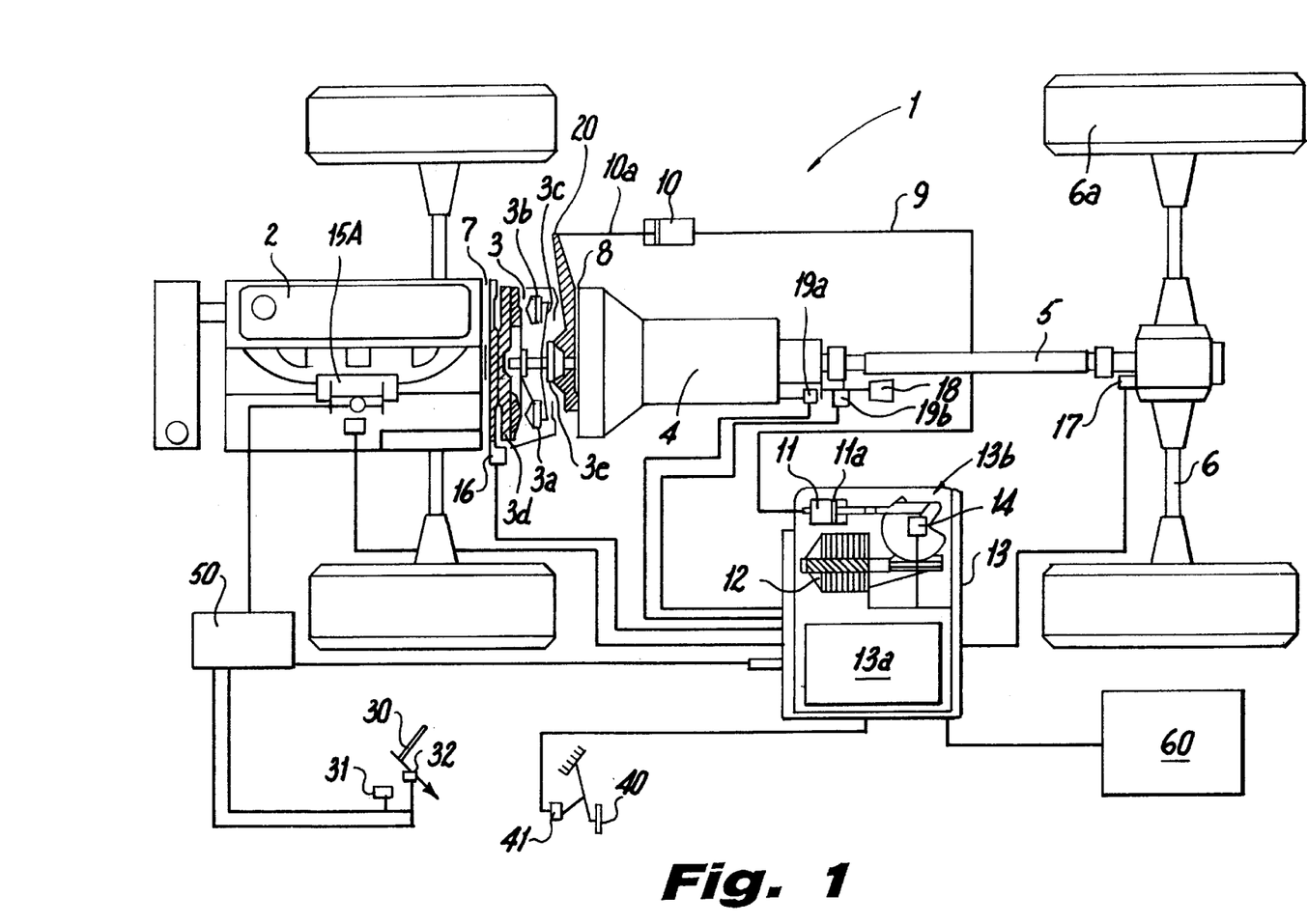
FIG. 1 is a schematic partially plan and partially sectional view of a motor vehicle having a power plant which embodies one form of the invention.

FIG. 1 shows certain details of a motor vehicle 1 having a power train which includes a prime mover 2 (e.g., a motor or an internal combustion engine and hereinafter referred to as engine). A rotary output element (such as a camshaft or a crankshaft) of the engine 2 can transmit torque to an automated torque transmitting system 3 here shows as a friction clutch having an input section 7 operatively connected with the output element of the engine 2 and an output section 8 arranged to transmit a variable torque to a rotary input element of a change-speed transmission 4. An output shaft 5 of the transmission 4 can transmit torque to a differential between two live axles 6 arranged to rotate the respective wheels 6a of the vehicle 1.

In accordance with a modification (not specifically shown in the drawings), the illustrated clutch 3 or an equivalent torque transmitting system can be replaced with a torque transmitting system which is installed downstream of the transmission 4 (as seen in the direction of power flow from the engine 2 to the driven wheels 6a).

The automated torque transmitting system 3 in the power train of the motor vehicle 1 can constitute a friction clutch (this is actually shown in FIG. 1), a dry friction clutch, a safety clutch, a direction reversing clutch, a multiple-disc clutch, a magnetic powder clutch, a bypass or lockup clutch of the type customarily employed in hydrokinetic torque converters, a starter clutch, a torque converter, a wet clutch or any other suitable torque transmitting system. Furthermore, the illustrated friction clutch 3 can be replaced with a friction clutch (such as that disclosed in commonly owned U.S. Pat. No. 5,450,934 granted Sep. 19, 1995 to Paul Maucher for "FRICTION CLUTCH") which embodies means for automatically compensating for wear at least upon the friction linings of a clutch disc or clutch plate serving to transmit torque to the input element of a transmission or to another component part of the power train in a motor vehicle.

Direction reversing clutches which can be utilized in the power train of the present invention are disclosed, for example, in commonly owned U.S. Pat. No. 5,217,412 granted Jun. 8, 1993 to Norbert Indlekofer et al. for "CONTINUOUSLY VARIABLE SPEED TRANSMISSION".

A hydrokinetic torque converter with a lockup or bypass clutch is disclosed, for example, in commonly owned U.S. Pat. No. 5,377,796 granted Jan. 3, 1995 to Oswald Friedmann et al. for "APPARATUS FOR TRANSMITTING FORCE BETWEEN ROTARY DRIVING AND DRIVEN UNITS".

The disclosures of all U.S. patents which are referred to in this specification are incorporated herein by reference.

The input section 7 of the friction clutch 3 which is shown in FIG. 1 comprises a flywheel 3d (also called counterpressure plate) having a friction surface adjacent a set of friction linings at one side of a rotary clutch disc or clutch plate 3a forming part of the output section 8 and serving to transmit torque to a rotary input element (e.g., a shaft) of the transmission 4. The clutch disc 3a has a second set of friction linings adjacent the friction surface of an axially movable pressure plate 3b which rotates with the flywheel 3d and can be urged against the adjacent friction linings by a clutch spring 3c, e.g., a tiltable diaphragm spring installed in the rotary housing of the clutch 3.

The clutch 3 further comprises means for tilting the diaphragm spring 3c relative to the clutch housing to thus select the magnitude of the torque (including zero torque) which the flywheel 3d and the pressure plate 3b can transmit to the input element of the transmission 4 by way of the clutch disc 3a and its friction linings. Such tilting means comprises a bearing 3e which is movable axially of the clutch 3 toward and away from engagement with radially inwardly extending resilient tongues or prongs of the diaphragm spring 3c. The bearing 3e is movable axially by a pivotable lever 20 forming part of a hydromechanical connection between an actuator 13b of an operating means for the automated clutch 3. The operating means further comprises a signal receiving, processing and transmitting control unit 13 as well as means (such as sensors and/or electronic circuitry, and conductors, e.g., buses) for transmitting signals to the input or inputs of the control unit 13.

The illustrated transmission 4 is a manually shiftable gearing having, for example, a neutral gear, a reverse gear and several forward gears. The means for shifting into or from a selected gear comprises a lever 18 which can be manipulated by the operator of the motor vehicle 1. However, it is also possible to replace the illustrated manually shiftable transmission 4 with an automated transmission receiving signals from the operating means including the control unit 13 or from discrete operating means with one or more actuators. For example, an automated transmission can be of the type which is shiftable into different gears while it does not transmit torque. Alternatively, the illustrated manually shiftable transmission 4 can be replaced with an automatic transmission which can change gears essentially without an interruption of torque or power transmission and normally comprises one or more planetaries. It is also possible to employ a continuously variable transmission (CVT), e.g., a transmission of the type disclosed in the aforementioned U.S. Pat. No. 5,217,412 to Norbert Indlekofer et al., or in commonly owned U.S. Pat. No. 5,169,365 granted Dec. 8, 1992 to Oswald Friedmann for "POWER TRAIN", or in commonly owned U.S. Pat. No. 5,667,448 granted Sep. 16, 1997 to Oswald Friedmann for "POWER TRAIN".

The control unit 13 of the means for operating the automated clutch 3 includes an electronic circuit 13a serving to process incoming signals and to transmit processed signals to the actuator 13b. FIG. 1 shows that the actuator 13b is confined in the housing or casing of the control unit 13; however, it is equally within the purview of the invention to provide a discrete housing for a portion of or for the entire actuator 13b. It is further possible to install certain parts of the control unit 13 and the actuator 13b in a first housing, and to confine the remaining parts of the control unit and the actuator in a discrete second housing.

The actuator 13b comprises a driving unit 12 (such as an electric motor) which receives signals from the electronic circuit 13a of the control unit 13. The circuit 13a can include the power electronics as well as the regulating electronics for the driving unit 12. Such design is particularly desirable if the control unit 13 and the actuator 13b are to be confined in a common housing. The illustrated driving unit 12 transmits motion to a worm gearing which, in turn, transmits motion to a spur gearing or to a crank drive or to a feed screw of the illustrated actuator 13b.

In addition to the lever 20, the connection between the actuator 13b and the bearing 3e of the automated clutch 3 comprises a master cylinder 11 having a reciprocable piston 11a connected to the output element of the actuator 13b, a slave cylinder 10 having a reciprocable piston rod 10a serving to pivot the lever 20, and a fluid-containing (e.g., hydraulic) conduit 9 connecting one chamber of the master cylinder 11 with one chamber of the slave cylinder 10. As already mentioned hereinbefore, the illustrated fluid-operated connection 9–11a between the actuator 13b and the lever 20 for the bearing 3e can constitute a purely mechanical connection such as a link train or the like.

The means for transmitting various signals to the input or inputs of the electronic circuit 13a of the control unit 13 comprises a sensor 14 which monitors the acceleration, speed, position, inclination and/or one or more additional parameters of the actuator 13b and/or of the connection 9–11a between the actuator 13b and the lever 20 to furnish signals denoting the extent of engagement or disengagement of the clutch 3, i.e., the magnitude of the torque which the constituents 3b, 3d of the clutch can transmit to the respective friction linings of the clutch disc 3a. In other words, the signals from the sensor 14 denote the magnitude of the torque being transmitted from the engine 2 to the rotary input element of the transmission 4. In the embodiment of FIG. 1, the signals from the sensor 14 represent the axial positions of the piston 11a of the master cylinder 11. Furthermore, the signals from the sensor 14 can be evaluated to indicate the speed and/or the extent and/or the rate (acceleration) at which the condition of the clutch 3 has changed between successive monitoring steps being carried out by such sensor.

The conduit 9 can contain a hydraulic or a pneumatic fluid. Furthermore, the electric motor 12 of the actuator 13b can be replaced with another suitable driving unit or with several driving units, e.g., with one or more fluid-operated motors (such as single-acting or double-acting cylinder and piston units). It is also possible to employ an actuator which comprises one or more permanent magnets and/or electromagnets.

The lever 20 can include or constitute a pivotable and/or reciprocable fork which can change the axial position of bearing 3e to an extent determined by the control unit 13 and effected by the actuator 13b. The pressure plate 3b of the clutch 3 is assumed to have two end positions in one of which the clutch is fully engaged (i.e., the plates 3b, 3d drive the friction linings of the clutch disc 3a without any slip), and in the other of which the clutch is fully disengaged (i.e., the plates 3b, 3d can rotate but the clutch disc 3a is at a standstill). In addition, the pressure plate 3b can assume a finite or an infinite number of intermediate positions in each of which the plates 3b, 3d transmit torque to the clutch disc 3a but are free to slip relative to the respective friction linings to a predetermined extent.

The torque which the engine 2 transmits to the flywheel or counterpressure plate 3d can be selected in such a way that the torque which the clutch disc 3a can transmit to the transmission 4 can vary within a desired range and which is less than the torque being transmitted by the engine except when the clutch is fully engaged. The actuator 13b can be operated to maintain the lever 20 in a given position for a desired interval of time, i.e., to ensure that the magnitude of the torque being transmitted by the clutch 3 to the transmission 4 matches a desired value.

It is also possible to design the clutch 3 in such a way that the maximum torque being transmissible to the transmission 4 exceeds the maximum torque being transmissible from the engine 2 to the clutch 3. This renders it possible to transmit a full range of actual engine torques and further enables the clutch to absorb or take up or isolate any undesirable peaks of engine torque such as could cause undesirable fluctuations of torque being transmitted by the power train including the engine 2, the clutch 3, the transmission 4 and the differential between the output shaft 5 and the axles 6.

The means for transmitting signals to the input(s) of the electronic circuit 13a of the control unit 13 includes several additional sensors and electronic circuits some of which are shown in FIG. 1. Such signals can be processed by the circuit 13a with and/or independently of the signals from the sensor 14, and the circuit 13a generates processed signals which are transmitted to the driving unit 12 of the actuator 13b for the clutch 3. The processed signals determine the magnitude of the torque being transmitted from the plates 3b, 3d to the friction linings of the clutch disc 3a, i.e., from the engine 2 to the transmission 4. The sensors and circuits which transmit signals to the circuit 13a can operate continuously or at a desired frequency.

FIG. 1 shows an electronic circuit 50 of the engine 2. This circuit is connected with a sensor 15 which monitors the inclination and/or one or more other parameters of a throttle valve 15A for the engine, i.e., the signals from the sensor 15 can denote the rate of fuel admission into the cylinders of the engine 2. The circuit 50 is connected with the circuit 13a by one or more conductors (shown but not referenced), such as a bus; this bus can transmit signals from the circuit 50 to the circuit 13a and/or vice versa. Additional conductors connect the engine circuit 50 with sensors 31, 32 which are associated with a gas pedal (load lever) 30. For example, the sensor 31 can be set up to transmit signals denoting the extent of depression of the gas pedal 30 and to thus indicate whether or not the operator of the motor vehicle 1 is in charge. The other sensor 32 can constitute a simple on/off (digital) switch which transmits signals denoting whether or not the engine 2 is idling. Thus, when the sensor (switch) 32 is off but the engine 2 is running, the bus between the circuits 50, 13a transmits a signal denoting that the engine is idling.

A further electronic circuit 60 is connected to the circuit 13a by a further conductor (e.g., a bus such as a CAN-bus) to indicate the condition of a standard antiblocking system (ABS). Alternatively, the circuit 60 can be associated with a suitable antislip regulator (ASR) or with such a regulator as well as with the antiblocking system. The conductor(s) between the circuits 13a and 60 can be designed or set up to transmit signals from the circuit 60 to the circuit 13a and/or vice versa.

A sensor 16 can transmit to the circuit 13a signals denoting the RPM of the rotary output element of the engine (e.g., of a crankshaft or a camshaft) and hence the RPM of the flywheel 3d. A further sensor 17 can act as a tachometer generator which monitors the RPM of a part of the differential and the RPM of the driven wheels 6a (i.e., the speed of the motor vehicle 1).

The gear selecting and/or shifting lever 18 of the transmission 4 is associated with one or more additional sensors.

FIG. 1 shows a sensor 19a which can transmit signals denoting the selected gear of the transmission 4, and a sensor 19b which can serve to transmit signals denoting the presence or absence of an intent on the part of the operator of the motor vehicle 1 to shift the transmission 4 into or from a particular gear (e.g., into neutral, into reverse gear or into one of several forward gears). The functions of the sensors 19a, 19b can be interchanged, or they can be designed to jointly perform the afore-enumerated functions.

For example, the sensor 19a can be installed and designed to furnish signals denoting the selected gear of the transmission 4 and/or the intention of the operator or driver to shift the transmission into a selected gear. Such sensor can be responsive to the direction and/or magnitude of the force being applied by the hand of an operator to the lever 18 and can thus further indicate whether or not the operator occupies her or his (driver's) seat. The sensor 19b can cooperate with the sensor 19a or it can furnish one or more discrete signals independently of the sensor 19a. For example, the extent and/or the direction and/or the speed (per unit of time) of the lever 18 can be monitored (by 19a and/or by 19b) to ascertain the gear which is being selected and/or shifted into by the member 18.

The illustrated signal transmitting sensors and circuits are not necessarily the only means for transmitting signals to and/or for receiving signals from the circuit 13a of the control unit 13. Thus, FIG. 1 shows a further sensor 41 which can be designed to transmit to the circuit 13a signals denoting the position of a brake pedal or lever 40. For example, the sensor 41 can be a digital sensor (such as a switch) which is set up to transmit signals denoting the condition of any one or all of two or more braking systems, such as a parking brake and a standard wheel braking system.

As already mentioned above, the circuit 13a of the control unit 13 can receive and/or transmit signals (from and to some or all of the signal transmitting means) either continuously or intermittently to transmit processed signals to the actuator 13b in dependency on the actual operating point. Thus, the circuit 13a transmits signals to the driving unit 12 of the actuator 13b, and such signals can be processed signals and/or signals received from certain sensors and/or circuits. To this end, there is implemented in the control unit 13 a control or regulating program in the form of hardware and/or software, and such program can be carried out by performing multiplications, divisions, subtractions and/or other functions as well as comparisons with memorized information such as characteristic fields, curves, tables and/or others.

In accordance with a presently preferred embodiment, the control unit 13 comprises or is associated with a torque ascertaining arrangement, an arrangement which ascertains the selected gear of the transmission 4, an arrangement which ascertains the extent of slip between the plates 3b, 3d and the respective friction linings of the clutch disc 3a forming part of the clutch 3, and/or an arrangement which furnishes information pertaining to the operating condition of the clutch. Such arrangements can be implemented in the form of hardware or software and can be confined in the housing of the control unit 13 or connected with the control unit by suitable conductor means (such as the aforementioned CAN-bus or buses).

As a rule, it is desirable to ascertain the RPM of a rotary output element of the engine 2 (sensor 15 and/or 16 and/or circuit 50), the selected gear of the transmission 4 (sensors 19a and/or 19b), and the extent of slip of the clutch 3 (sensor 14). A presently preferred transmission 4 can comprise a rotary and/or axially movable gear selecting and/or shifting shaft or rod which is at least partially confined in the case of the transmission and is monitored by one of the sensors 19a, 19b while the other sensor monitors the speed and/or the position of the member 18 and/or the magnitude of the force being applied to the member 18 by the operator of the motor vehicle 1.

The vehicle 1 can be further equipped with one or more visible signal generating devices, e.g., with one or more brake lights which are on when one or more brakes are being applied by the operator. If the vehicle embodies several brakes each of which can be operated by a discrete actuating member, it can also comprise at least one sensor 41 for each such discrete actuating member and at least one brake light for each sensor 41. It is also possible to employ one or more analog sensors 41 which is or are designed to indicate the extent of application of a single brake or of the respective brakes. An analog sensor can constitute or include a potentiometer. The lamp or lamps then emit light of different intensities and/or colors to thus indicate the extent of application of a single brake or of the respective ones of two or more brakes.

The control unit 13 can be designed to carry out a regulating or controlling function with an open control path or without adaption. However, it is also possible to employ a closed-loop control circuit with feedback. Still further, it is possible to employ a control unit including a controlling section with adaption and a regulating section.

The control unit 13 selects the extent of slip of the automated clutch 3 to determine the energy input of the friction linings on the clutch disc 3a on the basis of the slip and the magnitude of the torque being transmitted by the clutch. Alternatively, or in addition to a determination of the energy input of the friction linings, the control unit 13 can determine the rise of the temperature of the friction linings and/or the extent of (increased) wear upon the friction linings. Each of the thus ascertained values can be compared with a discrete threshold value which is stored in the memory or memories of the control unit 13. If at least one of these threshold values is exceeded, the control unit 13 ensures that the magnitude of the torque being transmitted by the automated clutch 3 is at least substantially unaffected by the aforementioned energy input for a first interval ($t_1$) of time, that the magnitude of torque being transmitted during a next-following second interval ($t_2$) of time varies (e.g., pulsates) as a function of time, and that the torque being transmitted by the clutch 3 is increased during a next-following third interval ($t_3$) of time or until the RPM of the engine 2 (see the sensor 16) decreases to a predetermined minimum value. In other words, the third interval can be shortened, depending upon the extent of a drop of RPM of the output element (such as a camshaft or a crankshaft) of the engine 2. The predetermined minimum value of the engine output RPM is designated $n_{MOT\_SCH}$.

Figure 2:
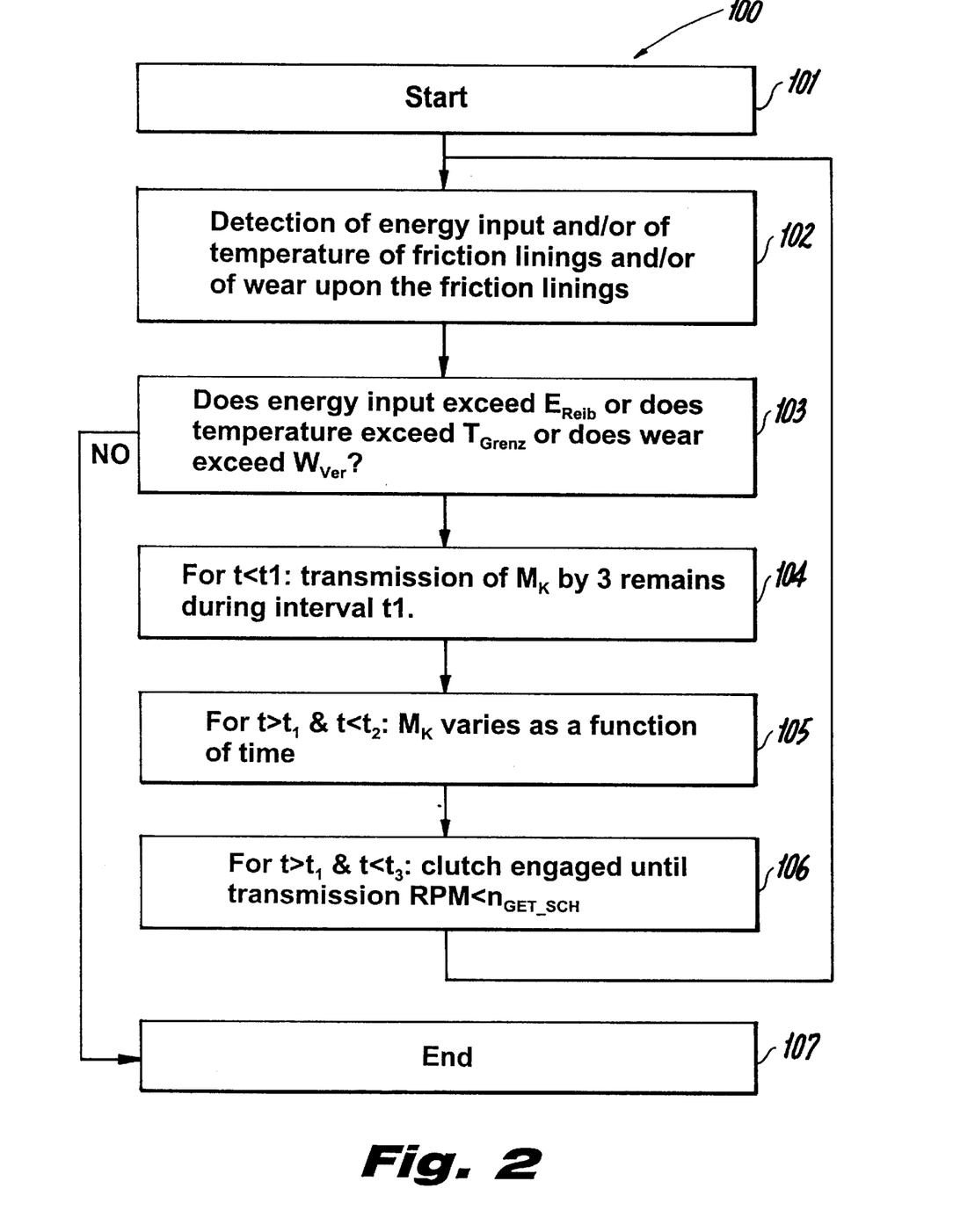
FIG. 2 is a flow chart wherein the blocks denote various stages of regulation of the torque which is being transmitted by an automated clutch of the improved power train.

The blocks in the flow chart or diagram 100 of FIG. 2 denote various stages of one presently preferred mode of controlling or regulating the automated clutch 3 in a power train which embodies the instant invention. The routine is started at 101, and the block 102 denotes the determination or calculation of the friction performance $E_{Reib}$. For example, such friction performance $E_{Reib}$ can be ascertained by determining the slip $n_S$ in the region of the friction linings on the clutch disc 3a and utilizing the thus ascertained value of $n_S$ with a value denoting the transmissible clutch torque $M_K$ to calculate the friction performance on the basis of the equation $E_{Reib}=M_K * n_S$. Reference may be bad to the aforementioned U.S. Pat. No. 5,823,912. The thus ascertained friction performance $E_{Reib}$ and a predetermined temperature pattern can be resorted to in order to ascertain the temperature of the friction linings (reference may be had again to the U.S. Pat. No. 5,823,912. By averaging the thus obtained temperatures of the friction linings, and by resorting to a set of predetermined functions or characteristic curves, one can also calculate the extent of wear upon the friction linings.

As is well known in the relevant art, the friction performance $E_{Reib}$ can be resorted to in order to ascertain, by integration, the energy and hence the energy input in the region of the clutch 3. The friction performance $E_{Reib}$ and the energy can be resorted to for the calculation of a temperature. Thus, the criterion for comparison can involve the energy input in lieu of the friction performance.

The block 103 denotes a procedure which involves a comparison in order to ascertain whether or not the friction performance, the energy input, the temperature and/or the wear upon the friction linings exceeds the corresponding threshold value $W_{Reib}$, $E_{Reib}$, $T_{Grenz}$ or $W_{Ver}$. If such is the case, the next step (see the block 104) involves the start of the first time interval $t_1$ during which the torque $M_K$ adapted to be transmitted by the clutch 3 is regulated or controlled (by the unit 13 and actuator 13b) independently of the friction energy, temperature or wear upon the friction linings.

After expiration of the first interval $t_1$, the control unit 13 selects for the clutch 3 a torque $M_K$ which varies as a function of time during a second time interval $t_2$ which follows the interval $t_1$ (see the block 105). Such varying torque brings about a relatively gentle bucking or surging of the vehicle 1.

Upon expiration of the interval $t_2$, the control unit 13 causes the clutch 3 to transmit a progressively increasing torque $M_K$ during a next-following third interval $t_3$ (note the block 106), and this entails a reduction of the engine RPM ($n_{MOt}$). The regulation of the clutch torque $M_K$ by the control unit 13 during the third interval $t_3$ is such that the engine RPM drops to or below a predetermined minimum value $n_{MOT\_SCH}$, namely a minimum value which entails a condition approximating a choking of the engine 2. When the minimum value $n_{MOT\_SCH}$ is reached or when the engine RPM drops below such value, the control unit 13 reduces the torque $M_K$ which is being transmitted by the clutch 3.

If the interval $t_3$ elapses before the engine RPM drops to or below the minimum value $n_{MOT\_SCH}$, the routine is repeated by starting a fourth interval corresponding to the first interval $t_1$ or a further interval corresponding to the interval $t_2$.

If the answer to the comparisons denoted by the block 103 is "NO", the routine is terminated at 107.

If a monitoring of the RPM of a rotary input element or another element (such as the aforementioned central shaft or rod) of the transmission 4 (e.g., by one of the sensors 19a, 19b or by an additional sensor, not shown) during the interval $t_2$ indicates that the RPM exceeds a preselectable threshold or maximum value $n_{GET\_SCH}$, the second interval $t_2$ can be shortened (terminated) and the third interval $t_3$ begins upon the expiration or termination of such shortened second interval. In other words, the duration of at least one of the intervals $t_1$, $t_2$, $t_3$ can vary. Thus, the duration of each of the three intervals may but need not match a preselected value. It is possible to select the intervals in such a way that they are of equal or nearly equal duration. However, at least the first interval $t_1$ can contain or embrace a waiting period which is prolonged in comparison with standard periods of computation by microprocessors. The aforementioned values $n_{MOT\_SCH}$ and $n_{GET\_SCH}$ can be selected in dependency upon the parameters of the motor vehicle, especially as a function of the gear of the transmission 4.

Figure 3:
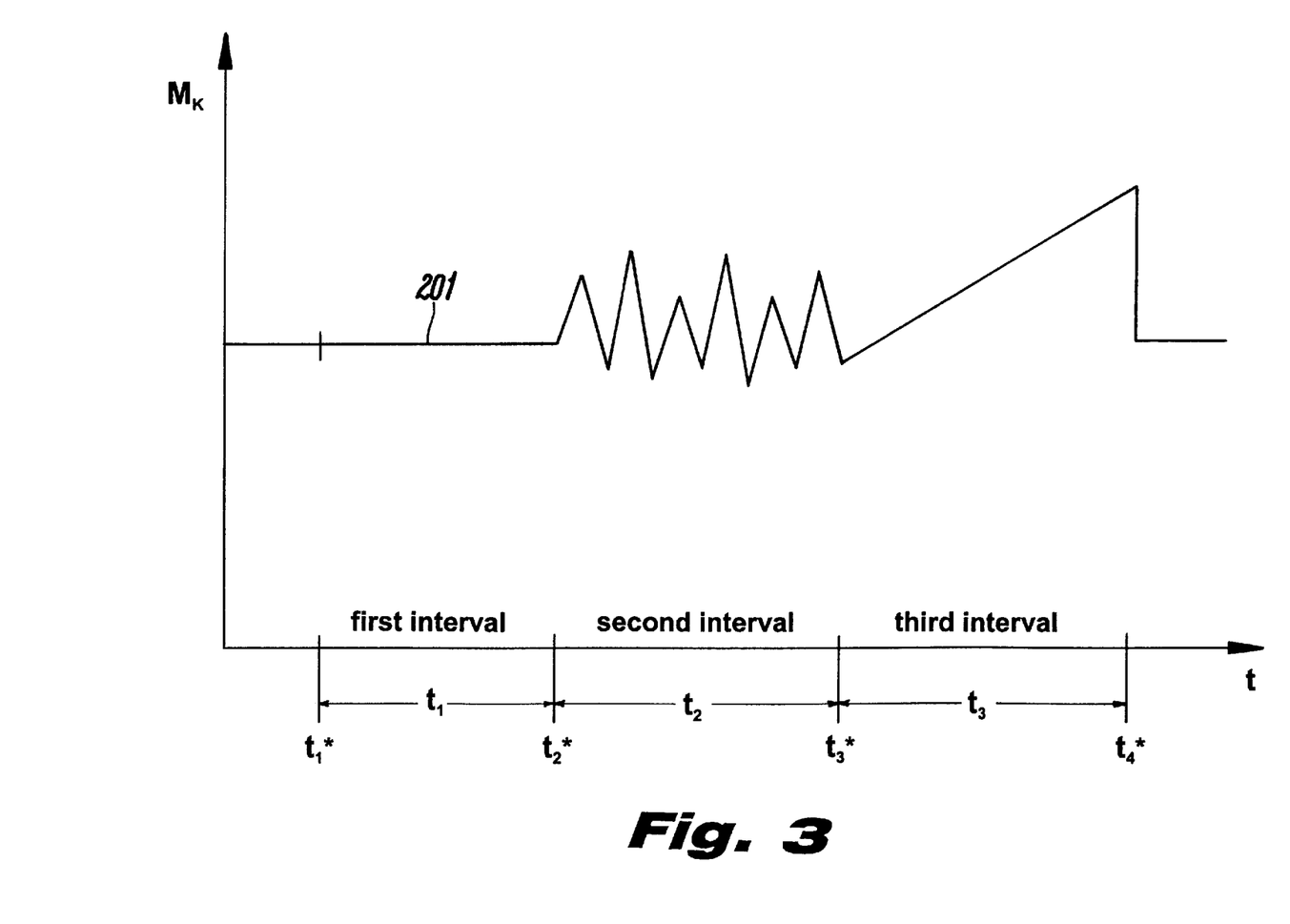
FIG. 3 is a diagram showing variations of clutch torque during certain successive intervals of operation of the power train.

Referring to FIG. 3, there is shown a coordinate system wherein time t is measured along the abscissa and the clutch torque $M_K$ is measured along the ordinate. The curve 201 is representative of the progress and variations of the clutch torque $M_K$ during and following the intervals $t_1$, $t_2$ and $t_3$, i.e., as a function of time.

Prior to the start of the first interval $t_1$, the torque which is being selected by the control unit 13 for transmission by the clutch 3 is not affected by friction energy. Such energy can be calculated or otherwise determined continuously or intermittently. At the instant $t_1$* (namely at the onset of the first interval $t_1$), the friction energy or the temperature (which is calculated on the basis of the friction energy) or the extent of wear (which is calculated on the basis of the friction energy and/or temperature of the friction linings) reaches or exceeds a threshold value. From the instant $t_1$* to the instant $t_2$* (i.e., during the interval $t_1$), the selection (by 13) of torque transmission via automated clutch 3 is not influenced by the friction energy and/or the temperature and/or the wear upon the friction linings (see the corresponding portion of the curve 201). During the interval $t_1$, the operator or driver of the motor vehicle 1 is given the opportunity to complete the actual operation, such as for example setting the vehicle in motion.

During the second interval $t_2$ (namely between the instants $t_2$* and $t_3$*) the torque $M_K$ which is being transmitted by the clutch 3 is regulated by the control unit 13 in such a way that the magnitude of the torque $M_K$ varies as a function of time and a fixed or variable amplitide, i.e. the torque $M_K$ is being transmitted in a pulsating fashion (e.g., at a fixed or variable frequency and at alternating higher and lower amplitudes as denoted by the corresponding portion of the curve 201). The variations of amplitude and/or frequency of the corresponding portion of the curve 201 can be regulated periodically or aperiodically.

During the third interval $t_3$ (between the instants $t_3$* and $t_4$*), the torque $M_K$ rises steadily; however, and as already explained with reference to the flow chart of FIG. 2, the interval $t_3$ can be shortened if the magnitude of the torque $M_K$ reaches or rises above a value at which the RPM of the output element of the engine 2 is reduced to or below a minimum permissible value $n_{MOT\_SCH}$ at which a choking of the engine would take place.

The fully or partially elapsed interval $t_3$ is followed by a fourth interval corresponding to the interval $t_1$ or by a further interval corresponding to the interval $t_2$.

FIG. 3 shows that the entire interval $t_3$ has elapsed before the torque Mk was reduced to that during the interval $t_1$.

An advantage of the improved power train is that the first interval $t_1$ involves a period which is provided in order to afford the operator an opportunity to terminate the critical situation before the control unit 13 begins to influence (during the interval $t_2$) the torque $M_K$ which is being transmitted by the automated clutch 3 (compare the portions of the curve 201 above the intervals $t_1$ and $t_2$ shown in FIG. 3). The next stage (interval $t_2$) involves a preferably gentle rocking or bucking of the vehicle, and the final stage (interval $t_3$) involves a more pronounced warning or signal which is not likely to be ignored by the operator. During the next interval (such as $t_1$ following $t_3$), the operator is again given an opportunity to terminate the critical situation while the control unit 13 does not change the torque $M_K$. Alternatively, the third interval $t_3$ is followed by a further interval (such as $t_2$) which involves a renewed generation of a gentle or relatively gentle signal as a warning to the operator of the vehicle 1.

As already mentioned hereinbefore, the duration of one or more intervals can be reduced to zero, for example, in dependency upon the selected gear of the transmission 4. To this end, the control unit 13 can resort for example to its memory or memories which serves or serve for the storage of appropriate characteristic fields or characteristic curves or other suitable information.

The value of $n_{MOT\_SCH}$ can match or can depart from the value of $n_{GET\_SCH}$. At least one of these values can be selected by the control unit 13 in dependency upon the selected gear of the transmission 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and, therefore, such adaptations should and are intended to be comprehended within the meaning and range of equivalence of the appended claims.

What is claimed is:

1. A motor vehicle comprising a power train including a transmission; a variable-RPM prime mover; a repeatedly engageable and disengageable automated torque trasmitting clutch having friction linings which are subject to heating and wear in response to repeated engagement and disengagement of the clutch and which are arranged to slip relative to adjacent constituents of the clutch in an at least partially engaged condition of the clutch; and means for operating said clutch, including a signal receiving, processing and transmitting control unit, means for transmitting signals to said control unit including means for transmitting signals denoting the RPM of said prime mover, and at least one actuator for changing the extent of engagement of and hence the magnitude of torque being transmitted by said clutch in response to signals from said control unit, said control unit being arranged to carry out at least one of the operations including determining and ascertaining the extent of slip of said friction linings relative to said adjacent constituents of the clutch, to ascertain the magnitude of torque which the clutch can transmit, to calculate at least one of (a) an energy input of said friction linings, (b) a rise of temperature of said friction linings, and (c) the extent of wear upon said friction linings on the basis of the ascertained slip and magnitude of torque, to compare the ascertained magnitude of torque with a first threshold value, to compare the ascertained rise of temperature with a second threshold value, to compare the ascertained extent of wear with a third threshold value, to maintain the magnitude of torque being transmitted at least substantially unaffected by said energy input for a first interval of time when at least one of said threshold values is exceeded, to repeatedly vary the magnitude of torque being transmitted as a function of time during a second interval of time following said first interval, and to increase the torque being transmitted by said clutch during a third interval of time following at least one of (a) the elapse of said second interval and (b) the elapse of said second interval but prior to expiration of said third interval when the RPM of said prime mover decreases to a predetermined minimum value.

2. The motor vehicle of claim 1, wherein said signal transmitting means comprises at least one of (i) a plurality of sensors and (b) a plurality of electronic circuits.

3. The motor vehicle of claim 1, wherein said signal transmitting means comprises at least one of (A) at least one conductor and (B) at least one bus.

4. The motor vehicle of claim 1, wherein said control unit is arranged to vary at least one of (I) the amplitude and (II) the frequency of variable torque being transmitted during said second interval of time.

5. The motor vehicle of claim 1, wherein said control unit is arranged to pulsate the torque being transmitted during said second interval of time.

6. The motor vehicle of claim 1, wherein said control unit is arranged to maintain the magnitude of the torque, which is being transmitted upon elapse of said third interval of time, at least substantially unaffected by said energy input for a fourth interval of time having a duration at least approximating said first interval.

7. The motor vehicle of claim 1, wherein said control unit is arranged to maintain the magnitude of the torque, which is being transmitted when the RPM of said prime mover decreases to said predetermined minimum value, at least substantially unaffected by said energy input for a fourth interval of time having a duration at least approximating that of said first interval.

8. The motor vehicle of claim 1, wherein said control unit is arranged to repeatedly vary the magnitude of torque being transmitted upon elapse of said third interval for a further interval of time having a duration at least approximating that of said second interval.

9. The motor vehicle of claim 1, wherein said control unit is arranged to repeatedly vary the magnitude of torque being transmitted when the RPM of said prime mover decreases to said predetermined minimum value for a further interval of time having a duration at least approximating that of sad second interval.

10. The motor vehicle of claim 1, wherein said control unit includes means for varying the duration of at least one of said first, second and third intervals of time.

11. The motor vehicle of claim 1, wherein said control unit comprises means for maintaining constant at least one of said first, second and third intervals of time.

12. The motor vehicle of claim 1, wherein said transmission is shiftable into any one of a plurality of different gears and comprises gear selecting means, said control unit comprising means for determining the duration of at least one of said first, second and third intervals of time as a function of the selected gear of said transmission.

13. The motor vehicle of claim 1, wherein said transmission comprises a variable-RPM rotary element and said control unit includes means for cutting short said second interval of time when the RPM of said element of said transmission at least reaches a predetermined value.

14. The motor vehicle of claim 13, wherein said element is an input element of said transmission.

15. The motor vehicle of claim 13, wherein said predetermined RPM of said element of said transmission at least approximates said predetermined minimum RPM of said prime mover.

16. The motor vehicle of claim 13, wherein said predetermined RPM of said element of said transmission differs from said predetermined minimum RPM of said prime mover.

17. The motor vehicle of claim 13, wherein said transmission is shiftable into any one of a plurality of different gears and comprises gear selecting means, at least one of said predetermined RPM of said element of said transmission and said predetermined minimum value of the RPM of said prime mover being a function of the selected gear of said transmission.

* * * * *